(12) United States Patent
Stoffelsma et al.

(10) Patent No.: US 8,018,330 B2
(45) Date of Patent: Sep. 13, 2011

(54) METHOD FOR AUTOMATICALLY DETECTING THE USE OF A MEANS OF TRANSPORT CONVEYING PERSONS

(75) Inventors: Bouke C. Stoffelsma, Mönchengladbach (DE); Manfred Feiter, Mönchengladbach (DE)

(73) Assignee: MCITY GmbH (DE)

( * ) Notice: Subject to any disclaimer, the term of this patent is extended or adjusted under 35 U.S.C. 154(b) by 922 days.

(21) Appl. No.: 11/792,127

(22) PCT Filed: Dec. 2, 2005

(86) PCT No.: PCT/EP2005/012891
§ 371 (c)(1),
(2), (4) Date: Aug. 7, 2007

(87) PCT Pub. No.: WO2006/058765
PCT Pub. Date: Jun. 8, 2006

(65) Prior Publication Data
US 2008/0126188 A1   May 29, 2008

(30) Foreign Application Priority Data

Dec. 2, 2004  (DE) ................ 10 2004 058 273
Dec. 2, 2004  (EP) ...................... 04028569
Dec. 16, 2004 (DE) ................ 10 2004 061 180

(51) Int. Cl.
*G08B 19/00* (2006.01)
(52) U.S. Cl. ............. 340/522; 340/988; 340/539.1; 340/539.11; 340/539.21; 340/539.23
(58) Field of Classification Search ............ 340/988, 340/539.1, 539.11, 539.21, 539.23; 380/24
See application file for complete search history.

(56) References Cited

U.S. PATENT DOCUMENTS

| | | | | |
|---|---|---|---|---|
| 4,449,186 A * | 5/1984 | Kelly et al. | ............. | 705/5 |
| 4,857,925 A * | 8/1989 | Brubaker | ............. | 340/994 |
| 5,485,520 A | 1/1996 | Chaum et al. | | |
| 5,554,832 A * | 9/1996 | Lumme et al. | ............. | 187/380 |
| 5,915,214 A | 6/1999 | Reece et al. | | |
| 6,184,802 B1 * | 2/2001 | Lamb | ............. | 340/994 |
| 6,191,708 B1 * | 2/2001 | Davidson | ............. | 701/204 |
| 6,595,416 B1 * | 7/2003 | Newsome et al. | ............. | 235/381 |

(Continued)

FOREIGN PATENT DOCUMENTS

DE      199 57 660 A1   7/2000

(Continued)

OTHER PUBLICATIONS

International Search Report for PCT/EP2005/012891 dated Mar. 6, 2006 (in German and English).

(Continued)

*Primary Examiner* — Daryl Pope
(74) *Attorney, Agent, or Firm* — Harness, Dickey & Pierce, P.L.C.

(57) ABSTRACT

Disclosed is a method for automatically detecting the use of a means of transport (10; 16) conveying persons. According to said method, a transmitter emits signals, a receiver receives signals emitted by the transmitter, positional and/or movement-related data of the means of transport are determined, and the use of the means of transport is detected based on an evaluation of the change in intensity of successive signals received by the receiver as well as the positional and/or movement-related data.

16 Claims, 3 Drawing Sheets

U.S. PATENT DOCUMENTS

| | | | |
|---|---|---|---|
| 6,888,443 | B2 | 5/2005 | Ritter |
| 6,922,156 | B2 | 7/2005 | Kavner |
| 7,577,452 | B2 | 8/2009 | Kimura et al. |
| 2002/0094829 | A1* | 7/2002 | Ritter ............................ 455/517 |
| 2002/0170962 | A1 | 11/2002 | Besling et al. |
| 2003/0036355 | A1* | 2/2003 | Gundlach ....................... 455/41 |
| 2003/0120567 | A1* | 6/2003 | Macklin .......................... 705/35 |
| 2003/0164399 | A1 | 9/2003 | Harris |
| 2003/0236748 | A1 | 12/2003 | Gressel |
| 2004/0006512 | A1 | 1/2004 | Rebsamen |
| 2004/0006515 | A1* | 1/2004 | Brey et al. ....................... 705/26 |
| 2004/0015475 | A1* | 1/2004 | Scheepsma ....................... 707/1 |
| 2004/0070501 | A1* | 4/2004 | Degrauwe et al. ......... 340/572.1 |

FOREIGN PATENT DOCUMENTS

| | | |
|---|---|---|
| DE | 103 41 189 A1 | 8/2004 |
| EP | 0 465 456 A1 | 1/1992 |
| EP | 1 089 237 A | 4/2001 |
| EP | 1 304 670 A1 | 4/2003 |
| EP | 1 326 201 A1 | 7/2003 |
| EP | 1 333 406 A1 | 8/2003 |
| WO | WO 01/03075 A1 | 1/2001 |
| WO | WO 01/69540 A1 | 9/2001 |
| WO | WO 02/056237 A2 | 7/2002 |
| WO | WO 02/071340 A1 | 9/2002 |
| WO | WO 02/077923 A1 | 10/2002 |

OTHER PUBLICATIONS

Office Action, mailed Mar. 3, 2011, U.S. Appl. No. 11/792,126.
Office Action, mailed Apr. 29, 2009, U.S. Appl. No. 11/792,008.
Office Action, mailed Sep. 30, 2009, U.S. Appl. No. 11/792,008.
Advisory Action, mailed Jan. 20, 2010, U.S. Appl. No. 11/792,008.
Office Action (Election/Restrictions), mailed Jun. 1, 2010, U.S. Appl. No. 11/792,008.
Office Action, mailed Sep. 1, 2010, U.S. Appl. No. 11/792,008.
Examiner's Answer to Appeal Brief, mailed Feb. 24, 2011, U.S. Appl. No. 11/792,008.
International Search Report for PCT/EP2005/012890 dated Feb. 20, 2006 (in German and English).
International Search Report (in English) and Written Opinion of the International Searching Authority (in German) for PCT/EP2005/012893, dated Mar. 24, 2006; ISA/EP.
Google Patent Search, 2 pages, Apr. 9, 2009.

* cited by examiner

METHOD FOR AUTOMATICALLY DETECTING THE USE OF A MEANS OF TRANSPORT CONVEYING PERSONS

The present invention relates to a method for automatically detecting the use of a means of transport conveying persons.

Hitherto the use of chargeable means of transport, in particular the public passenger traffic, has been mainly realised by using tickets printed on paper. But these tickets are complicated to handle and can be relatively easily falsified.

For several years there have been different methods in the state of the art, in which the tickets made of paper are replaced with an electronic ticket. These electronic tickets are automatically detected, when a chargeable means of transport is used, whereupon the fare can be automatically determined and deducted.

Different methods are known from the state of the art that shall enable an automatic detection and a comfortable deduction:

In Hanau the Rhein-Main-Verkehrsverbund operates on trial a so called "check in/check out" system, in which the passenger identifies himself by means of a chip card at a terminal in the vehicle on getting into and out of the vehicle. A background system then calculates which distances the customer has actually traveled and books the calculated fares on an account related to the chip card.

When being arranged in means of transport, such "check in/check out" systems have the drawback that they are normally not suitable for mass applications: One should imagine a full underground train during the rush hours, in which each passenger has to go to a terminal for checking out shortly before or on arrival at the target stop. This can in fact only be realised with closed systems having rotating bars at each stop, such as for example the tube in London. For open systems as they are usual in Germany this is rather unpractical. Furthermore, for holders of monthly season-tickets the additional effort for check in and check out proves to be a worsening in comparison to the paper ticket.

From PCT application NL01/00215 a method is known, in which the passenger uses a mobile apparatus (for example a mobile phone or a transponder) with a number allocated to him, in order to be automatically identified when he is in a vehicle of the public short-distance traffic. The vehicle automatically registers where the passenger gets into the vehicle and where he leaves the vehicle. Usually, these data are transmitted to a background system that determines the fare for the traveled distance on the base of these data. Such systems are often called "be-in/be-out" systems.

From DE 199 57 660 another method for deducting the fare for the use of public transport means is known, which is also a "be-in/be-out" system. In this method a cheque card-like memory that is carried along by the user is charged with a credit. During the use of public transport means, the transport means emits counting pulses and for each received counting pulse a pre-determined amount is deducted from the credit that is memorized on the memory unit. It is a drawback that the rates for the use of transport means cannot be determined in a sufficiently flexible manner.

From Switzerland a pilot project called "easyride" is known, in which the customer carries along a transponder card which registers him in the vehicle when he uses a vehicle and which repeats this registration regularly. Herein, the transponder card is recognized by means of antenna that are placed at the doors of the vehicle and that activate the transponder card and simultaneously send a vehicle identification signal to this one. The registration of the transponder card in the vehicle is realised via another transmitter. A problem of this method is the expensive installation of the antenna and the transmitter in the vehicle that are susceptible to defects. Furthermore, no regular function of the method can be assured in case of a breakdown of an antenna.

The above described "be-in/be-out" systems have the drawback that they are very expensive and hitherto susceptible to technical defects. Another drawback is that the mentioned "be-in/be-out" systems do not allow a precise determination whether a customer with the corresponding electronic ticket is inside a standing transport means or outside the transport means immediately beside this one. Thus, it cannot be excluded that user terminals which are carried along by persons who are in the proximity of transport means but who do not use these terminals, will receive signals from the transmitters located inside the transport means. In order to exclude that in such cases fares will be deducted for travels that have not been made, the detected travel data have to be checked afterwards. This is very complicate and expensive.

It is an object of the present invention to provide an alternative and improved method for automatically detecting the use of a chargeable transport means conveying persons.

This aim is achieved according to the present invention by a method according to claim 1. The dependent claims refer to individual embodiments of the present invention.

In the method according to the invention a transmitter emits signals which are received by a receiver. Furthermore, positional and/or movement-related data of the transport means are determined, by means of which a traveled distance or the velocity of the transport means can be determined. For detecting the use of the transport means, the changes in intensity of successive signals received by the receiver as well as the determined positional and/or movement-related signals are evaluated, which will be further explained in detail in the following by means of two alternatives of the method according to the invention.

In a first alternative of the method according to the invention for automatically detecting the use of a chargeable transport means conveying persons a transmitter that is placed in the area of the transport means emits signals which at least contain one transport means identification and movement-related and/or positional information that indicate a motion of the transport means, which information have previously been determined by suitable means. Signals that are emitted by the transmitter and received by a receiver integrated in a user terminal of a user will be evaluated in the user terminal on the base of the movement-related data and the change in intensity of successive signals, in order to determine whether the user terminal is in the transport means or not.

The communication between the transmitter and the receiver can be exclusively realised in a unidirectional way. This means that the transmitter exclusively transmits signals to user terminals being in the transmission range of the transmitter, but these user terminals do not respond to the received signals of the transmitter. Such an exclusively unidirectional communication, that is also called broadcast method, helps to avoid collisions that can occur when several user terminals simultaneously transmit data. In this case namely greater frequency ranges would have to be reserved such that a high number of user terminals can emit signals without interferences. This cannot be realised in particular at big traffic points of intersections. Another alternative would be the use of a protocol by means of which the data transmitted to the user terminals can be coordinated. However, such an implementation is complicate and extremely susceptible to errors. Furthermore, the transmitter located in the area of the transport means requires a communication connection to a central computer unit for the transmission of the received data, which is also related to efforts and costs.

As already mentioned above and according to the first alternative of the method according to the invention, the signals emitted from the transmitter that are received by a user terminal are evaluated on the base of the positional and/or movement-related data and the change in intensity of successive signals, i.e. signals that are received in a temporally offset order, in order to determine whether the user terminal is in the transport means or not. This is realised in the following way:

If the positional and/or movement-related data and intensities of successive signals indicate that the transport means moves or that the transport means has traveled a certain distance and the intensity of successive signals essentially remains the same, it is assumed that the user terminal is inside a transport means, such that a fare can be correspondingly determined and deducted.

If it is detected that the transport means moves while the intensity of successive signals clearly increases or decreases, it is assumed that the user terminal is outside the transport means, wherein the transport means is moving towards or away from the user terminal. Accordingly, no fare may be determined and deducted.

If the result of the evaluation is that the transport means stands still and the intensity of successive signals is constant, this can mean that the user terminal is inside a standing transport means or outside a standing transport means, wherein the user terminal itself does not move either. In this case, the determination and deduction of the fare will neither be started, since it is not assured that the user terminal is really inside the transport means.

Finally, it can be determined in the evaluation that the transport means does not move, but the intensity of successive signals clearly decreases. This indicates that the user terminal moves away from the standing transport means, thus the user terminal is outside the transport means. No fare may be determined and deducted in this case.

Due to this evaluation of the movement-related data transmitted from the transmitter to the receiver of the user terminal and the changes in intensity of successive signals it is excluded that fares are deducted from a user terminal that is not placed inside a transport means.

Preferably, the transmission range of the transmitter is limited such that the signals emitted from the transmitter can essentially only be received by user terminals that are located inside the transport means. In this manner it shall be achieved that user terminals that are placed outside the transport means and further away from this one, for example some meters away, will not receive signals from the transmitter. The number of user terminals that are unintentionally addressed by the transmitters is correspondingly reduced.

The transmitter preferably emits signals in regular time intervals which are for example a few seconds. Due to the evaluation of a plurality of received signals by means of the user terminals the reliability of the first alternative of the method according to the invention is increased.

Advantageously a reception and control device is arranged within the transport means, which device receives the signals emitted by the transmitter and controls the function of the transmitter by means of the received signals. Since the reception and control device and the transmitter have a defined mutual distance, it can be assumed that the signals of the transmitter that are received by the reception and control device present a constant intensity. If this is not the case, there is obviously an error, whereupon the first transmitter automatically changes the frequency on which it transmits. Alternatively, a substitute transmitter can be provided that takes over the work of the transmitter as soon as the reception and control device detects a functional defect of the transmitter.

According to an improvement of the present invention, a comparison transmitter is provided outside at the transport means in addition to the transmitter that is located inside the transport means, wherein the comparison transmitter emits comparison signals which are also received by user terminals that are placed inside the transmission range. The transmitter and the comparison transmitter preferably emit signals of the same intensity. If the evaluation by the user terminal shows that the intensity of the signal received by the transmitter is higher than the one of the signal received by the comparison transmitter, it is assumed that the user terminal is inside the transport means. If however the intensity of the signal emitted by the comparison transmitter is higher (during a pre-determined period of time) than the one of the signal emitted by the transmitter, it can be assumed that the user terminal is placed outside the transport means. In this way it can be for example determined whether a person who carries along a user terminal is present immediately beside a transport means or drives in a vehicle beside the transport means. Accordingly, also in these cases it can be assured that the use of a chargeable transport means will be correctly detected. Alternatively, the transmitter and the comparison transmitter can also emit signals with a pre-determined difference of intensity. Accordingly it can be determined which intensity has been reduced and which one not.

The transmitters preferably transmit on a small width of the frequency band such that a differentiation of signals that are emitted by other transmitters can be more easily realised, whereby less interferences occur.

In case that the user terminal receives signals from several transmitters and/or comparison transmitters that are placed within different transport means, which can be for example the case when two transport means stand or run immediately side by side, the number of received signals will be reduced by using exclusion criteria such that maximum one signal and/or one comparison signal remains. An exclusion criterion might be for example that a change in intensity of certain signals is detected or not and/or that a change of movement or position of the transport means is detected or not, as it has already been described above.

Furthermore, one of the transmitters preferably emits base signals that automatically activate user terminals which receive the base signals. Accordingly it can be assured that all user terminals which are present inside the transport means are switched on. Herein, the base signals are preferably emitted in a greater transmission range than the other signals, in order to assure that each user terminal is activated that is placed inside the transport means.

According to an alternative of the method according to the invention for automatically detecting the use of a transport means, the transmitter is integrated in a user terminal and the receiver is placed in the transport means. The signal emitted by the transmitter comprises an identification signal that unequivocally identifies the user terminal or the user and that is used in the evaluation, in order to determine which user terminal is in the transport means. Herein, the evaluation is realized in a separate evaluation unit that can also be provided in the transport means. If the presence of a user terminal in a transport means is detected by means of the evaluation unit, the fare will be determined and deducted. For the purpose of deduction a credit or deduction account established by the provider of the method can be allocated to each identification signal, via which account the determined fares can be deducted.

Similar to the first alternative, the transmission range of the transmitter is limited such that the receiver essentially only receives the signals emitted by the transmitter if the transmitter is placed inside the transport means, in order to reduce the number of signals that are emitted by transmitters outside the transport means to zero, if possible.

Advantageously, the transmitter emits signals in regular time intervals, wherein the time intervals preferably last a few seconds.

The receiver is preferably placed inside the transport means and a comparison receiver is placed outside at the transport means. If thus the transmitter integrated in the user terminal is inside the transport means, the signal that is received by the comparison receiver will be lower than the signal that is received by the receiver located inside the transport means. If however the transmitter is outside the transport means, the intensity of the signal received by the comparison receiver will be higher than the one of the signal received by the receiver. Accordingly one can draw the conclusion whether the user terminal and thus the person who carries this one along is inside or outside the transport means.

Also in the second alternative a transmitter is advantageously located in the area of the transport means, which transmitter emits base signals that automatically activate the user terminals that receive base signals.

In the following, alternatives of the method according to the invention will be described in greater detail with reference to the drawing. Herein.

In the following, the same reference numerals refer to objects or persons of the same kind.

Figure 1:
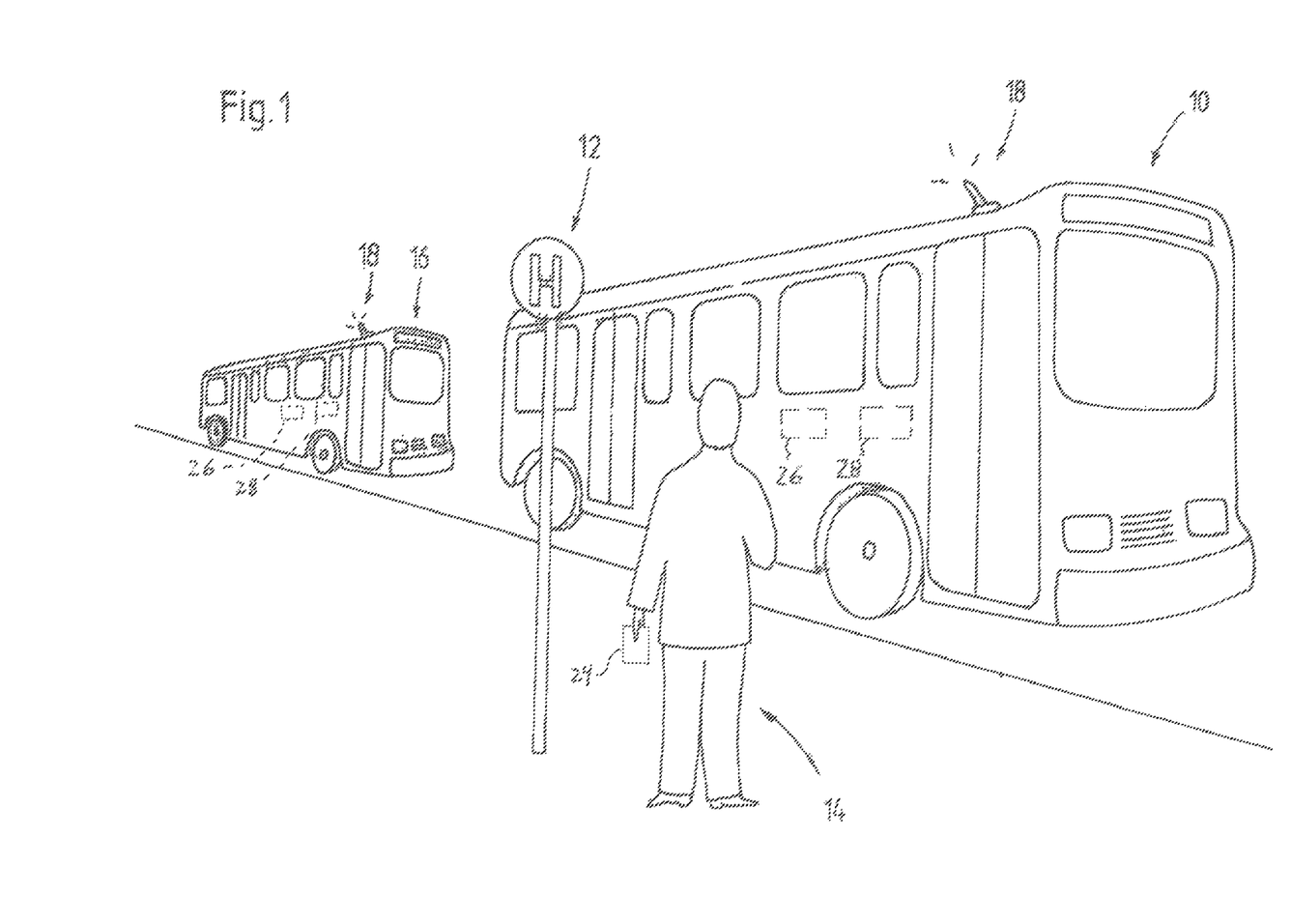
FIG. 1 is a perspective view by means of which a first alternative of the method according to the invention is described.

FIG. 1 shows a perspective view of a bus 10 that is standing at a bus stop which is marked with a bus stop sign 12. At the bus stop a person 14 is waiting who carries along a user terminal 24 that is suitable for carrying out the method according to the invention. The drawing shows another bus 16 that approaches the bus stop in a certain distance.

In the interior of each bus 10 and 16 a transmitter 26 is arranged that emits signals that contain at least one transport means identification for identifying the respective bus 10, 16 and movement-related information indicating a movement of the respective bus 10, 16. The transmission range of these transmitters is limited such that the signal emitted by the transmitter 26 can essentially only be received by a receiver 30 of user terminals 24 that are placed inside the transport means. However, for technical reasons it can often not be excluded that user terminals 24 of persons who are outside of one of the buses 10 or 16 in the proximity thereof also receive signals from the corresponding transmitter 26. The transmitters emit signals in regular time intervals, for example every five seconds.

Inside each bus 10, 16 there is arranged a reception and control device 28 that receives signals emitted by the corresponding transmitter 26 and controls the function of the transmitter by means of the received signals. Since both the reception and control device 28 and the transmitter 26 are placed inside the vehicle and are thus stationary, one can assume, due to the constant distance between the reception and control device and the transmitter, that the intensity of the signals emitted by the transmitter 26 and received by the reception and control device 28 remains constant over the time. If the reception and control device 28 determines during its verification of the received signals that the intensity of the received signals varies, it is assumed that the transmitter 26 is defect. In this case, the reception and control device 28 makes the transmitter 26 change the frequency or the channel on which it transmits. Simultaneously, the reception and control device 28 switches to the corresponding frequency or to the corresponding channel such that it can further receive the signals from the transmitter 26. In this way, errors that are based upon a disturbance of the frequency or channel can be excluded. If one or more changes of frequency or channel do not show the desired result, the transmitter 26 is switched of and replaced by a non represented substitute transmitter that is also placed in the interior of the buses 10 and 16 and that will then fulfill the function of the transmitter 26. Accordingly, errors due to a malfunction of the transmitter 26 can be excluded.

Each bus 10,16 comprises, apart from the transmitter 26, a comparison transmitter 18 that is located in the present case on the roof of the respective buses 10 and 16 and thus outside the buses. This comparison transmitter 18 emits comparison signals that are preferably emitted with the same intensity as the signals of the transmitter 26. If a person is in the interior of a bus 10 or 16, the intensity of the signals that are emitted by the transmitter 26 and received by the receiver 30 of user terminal carried along by a person is higher than the intensity of the comparison signals which the user terminal 24 receives from the comparison transmitter 18, since the comparison transmitter 18 is provided outside and the transmitter is provided inside each bus 10, 16. If the signals received from the transmitter 26 are stronger than the comparison signals received from the comparison transmitter 18, the user terminal 24 will assume that the person is inside the bus. If however the comparison signals received by the user terminal 24 from the comparison transmitter 18 are stronger than the ones from the transmitter 26, the person will be outside the bus.

The comparison transmitters 18 are also actively related to the reception and control device 28 which is placed inside each bus 10, 16 such that the function of the comparison transmitters 18 is also monitored by the reception and control device 28.

Finally, the comparison transmitters 18 emit base signals that automatically activate the user terminals 24 which receive the base signals, in order to assure that the user terminal 24 of each person who enters a bus 10, 16 is switched on.

In the following, an embodiment of the first alternative of the method according to the invention will be described in greater detail:

The user terminal 24 of the person 14 waiting at the bus stop receives base signals from both the comparison transmitter 18 of the bus 10 standing at the bus stop and the comparison transmitter 18 of the approaching bus 16, whereby it is automatically activated.

Since the person 14 is standing in the immediate proximity of the bus 10, the user terminal 24 also receives signals from the transmitter 26 arranged in the interior of the bus 10 as well as from the comparison transmitter 18 located on the roof of the bus 10. On the base of the movement-related data received from the transmitter 26 the user terminal determines that the bus 10 is actually standing still. The required movement-related data of the bus 10 can be for example transmitted to the transmitter 26 in the form of speedometer information, shaft encoder information or the like. Apart from the evaluation of the movement-related data received from the transmitter, the intensities of the signals received from the transmitter 26 and from the comparison transmitter are compared with each other. Since the signal transmission from the comparison transmitter 18 to the user terminal 24 is not adversely affected by the car body of the bus, in contrast to the one from the transmitter 26, the intensity of the comparison signals received by the user terminal 24 from the comparison transmitter 18 is higher than the one of the signals transmitted from the transmitter, which makes assume that the person 14 is actually still outside the bus 10.

It is possible that the user terminal 24 of the person 14 also receives signals from the comparison transmitter 18 of the approaching bus 16. But since the intensity of the signals received from the comparison transmitter 18 of the bus 16 is clearly lower than the one of the transmitter and the comparison transmitter 18 of the bus 10, the signals emitted from the comparison transmitter 18 of the bus 16 will be ignored by the user terminal 24. The low intensity of the signals emitted from the comparison transmitter 18 of the bus 16 thus serves as exclusion criterion.

If the person 14 then gets into the bus 10, the signal transmission from the comparison transmitter 18 of the bus 10 will be hindered by the car body of the bus 10, whereas the transmitter 26 arranged in the interior of the bus 10 can transmit without being adversely affected. Accordingly, the intensity of the signals received by the user terminal 24 of the person 14 from the transmitter is higher than the one of the signals received from the comparison transmitter 18. The user terminal can conclude from this that the person 14 is now inside the bus 10.

If the bus 10 then gets into motion, the evaluation of the movement-related data received from the transmitter 26 shows that the bus 10 has started its motion. Now it is verified whether the intensity of the signals received from the transmitter is essentially constant. If this is the case, it can be assumed that the person 14 is further inside the bus 10. Accordingly, the fare can now be determined. The determination of the fare and the calculation can be realised on the base of one of the initially described "be-in/be-out" systems or in an alternative way. For the determination and deduction of the fare a "broadcast" method is preferably used that is based upon a unidirectional communication. But since the determination and calculation of the fare is not an immediate object of the present invention, these ones will not be explained in detail in the following.

If the person 14 leaves the bus 10, the signals received by the user terminal 24 from the comparison transmitter 18 are at first again stronger than the signals transmitted by the transmitter 26. The user terminal 24 concludes from this that the person 14 is no longer in the bus 10. If the bus 10 then gets away from the person 14 and accordingly from the user terminal 24, the user terminal will receive movement-related data with decreasing intensity of the signals. Now it is assured that the person 14 has really left the bus.

The present invention has the essential advantage that a fare is only determined and deducted when the person 14 has really been transported in the bus 10.

It should be pointed out that one can principally renounce to the second transmitter 18. The evaluation of the movement-related data emitted by the transmitter and the change in the intensity of the signals received by the user terminal and transmitted by the transmitter are alone sufficient for showing whether the person 14 is inside or outside the bus 10. A moving bus 10 with constant intensity of the received signals is usually a sufficient indication that the person 14 is inside the bus 10. However, if it shall be excluded that a user terminal of a person who is driving in another vehicle in parallel side by side with the bus receives signals of constant intensity of a running bus 10, whereupon eventually a fare would be determined and deducted in an unjustified way, comparison signals will be required, for which reason the comparison transmitter 18 is provided in the exemplary embodiment.

Figure 2:
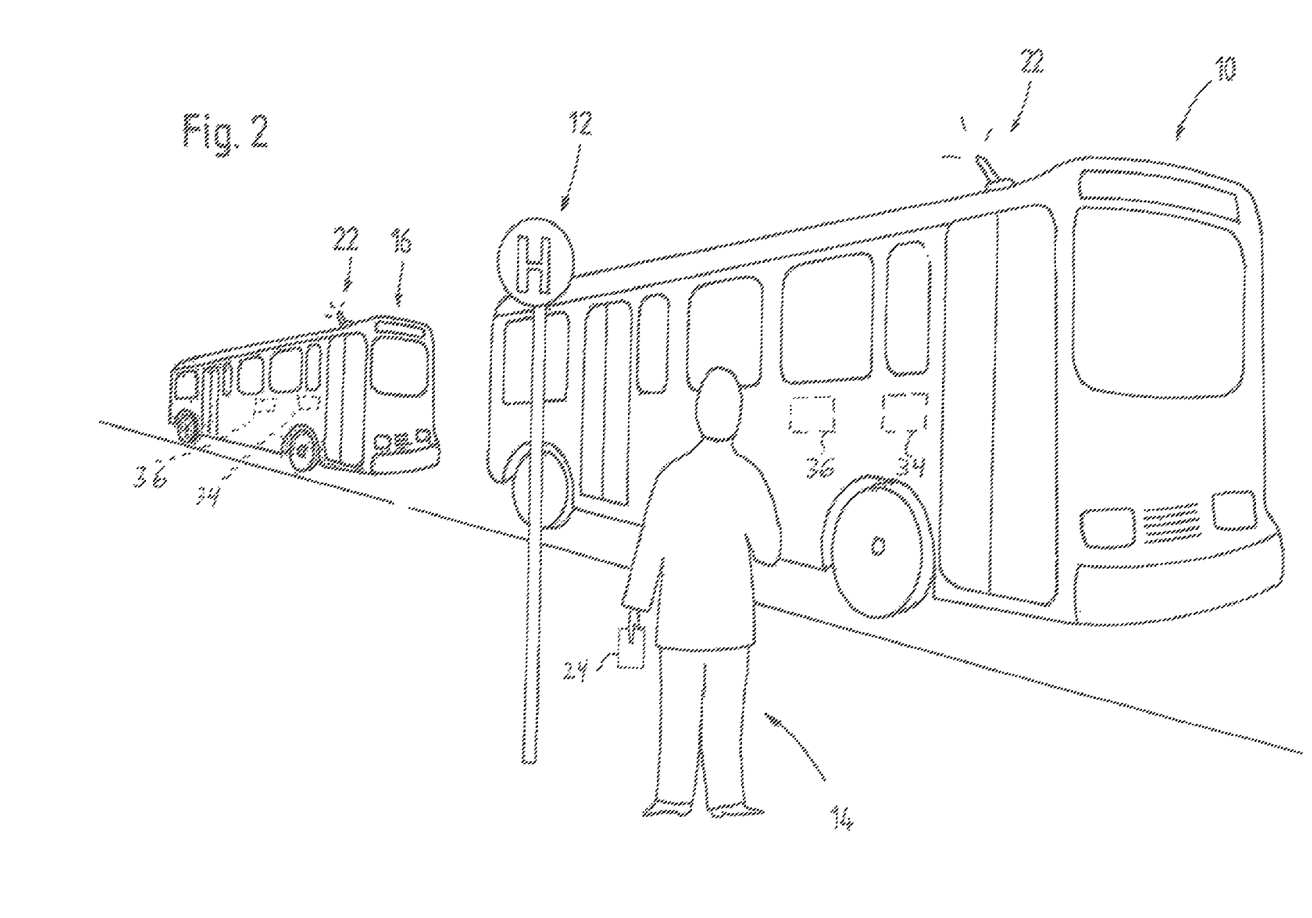
FIG. 2 is a perspective view by means of which a second alternative of the method according to the invention is described.
Figure 3:
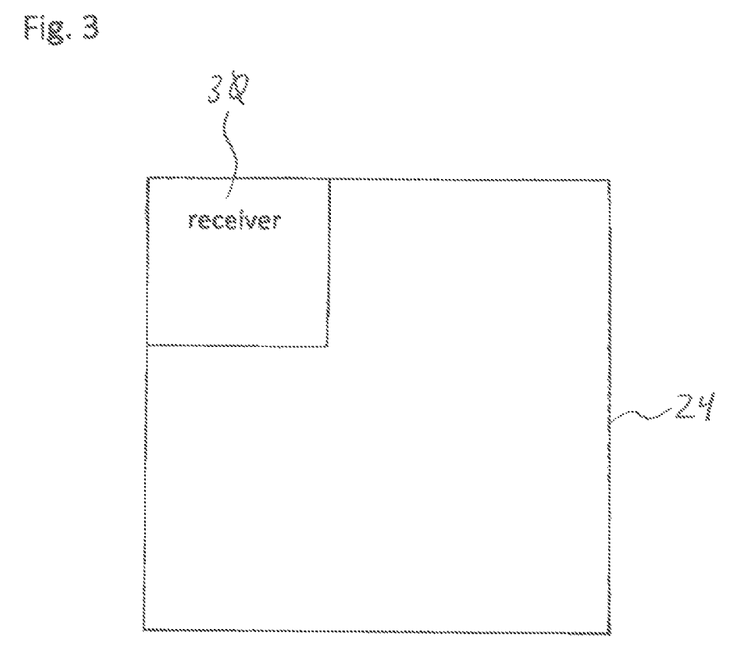
FIGS. 3 and 4 are schematic representations of a user terminal for the first alternative method and the second alternative method according to the invention.
Figure 4:
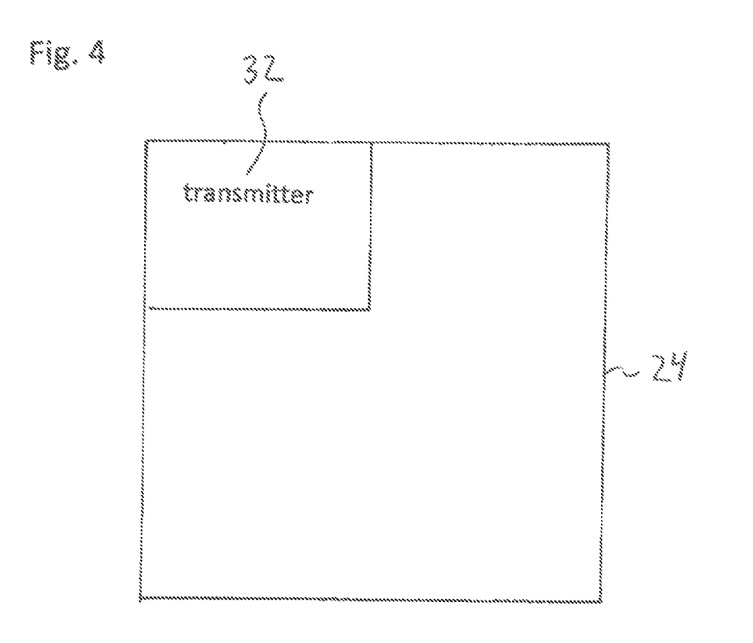

With reference to FIG. 2 a second alternative of the method according to the invention for automatically detecting a use of a transport means conveying persons will be described in the following. FIG. 2 shows, similar to FIG. 1, a perspective view of a bus 10 that is standing at a bus stop which is marked with a bus stop sign 12. At the bus stop a person 14 is waiting who carries along user terminal 24 that is suitable for carrying out the method according to the invention. A transmitter 32 is integrated in the user terminal 24, by means of which transmitter signals can be emitted that at least present an identification that unequivocally identifies the user terminal 24 or the user, such as for example a code or the like. The drawing shows another bus 16 that approaches the bus stop in a certain distance. In the interior of the buses 10 and 16 receiver 34 is arranged that is adapted for receiving signals emitted by user terminals 24. Furthermore, each of the buses 10 and 16 comprises an evaluation unit 36 by means of which the signals received by the receiver and emitted by user terminals 24 can be suitably evaluated together with positional and/or movement-related data of the transport means, which will be described in greater detail in the following.

Apart from the receiver, each of the buses 10 and 16 further comprises a comparison receiver 22 that is in the present case arranged on the roof of the respective buses 10 and 16 and outside the buses.

Since the person 14 is standing in the immediate proximity of the bus 10, both the receiver 34 located inside the bus 10 and the comparison receiver 22 placed on the roof of the bus 10 receive the signals emitted by the transmitter 32, wherein the received signals are transmitted to the evaluation unit 36. Furthermore, the positional and movement-related data that are detected in a suitable way are transmitted to the evaluation unit 36. Thereupon, an evaluation is carried out in the evaluation unit on the base of the received signals and the positional and movement-related data of the bus 10. By means of the positional and movement-related data the evaluation unit will determine that the bus 10 is actually standing still. Furthermore it is determined that the intensity of the signals received by the comparison receiver 22 is higher than the intensity of the signals received by the receiver 34 arranged inside the bus 10, since the transmission of the signals from the transmitter 32 of the user terminal 24 to the receiver 34 placed inside the bus 10 is impaired by the car body of the bus 10, in contrast to the transmission of signals from the transmitter 32 of the user terminal 24 to the comparison receiver 22. From this, one can conclude that the person 14 is actually still outside the bus 10.

If the person 14 then gets into the bus 10, the transmission between the transmitter 32 of the user terminal 24 and the comparison receiver 22 will be hindered by the car body of the bus 10, whereas the signal transmission from the transmitter 32 to the receiver 34 arranged in the interior of the bus 10 can be realised without being adversely affected. Accordingly, the intensities of the signals received by the receiver 34 arranged inside the bus 10 are higher than the intensities of the signals received by the comparison receiver 22. Accordingly, it can be concluded that the person 14 is now inside the bus 10.

If the bus 10 then gets into motion, the evaluation unit 36 will detect by means of the positional and movement-related data that the bus 10 has started its motion. If now the intensity of the signals received both by the receiver 34 arranged inside the bus 10 and by the comparison receiver remains constant, it is assured that the person 14 uses the transport means, such that a corresponding determination and deduction of the fare can be carried out. If however the intensity of the signals received by the receiver 34 and the comparison receiver 22 decreases when the bus is running, it can be assumed with certainty that the person 14 is not inside the bus 10, such that accordingly no fare will be determined and deducted.

The difference between the alternative described with reference to FIG. 1 and the alternative described with reference to FIG. 2 of the method according to the invention essentially is that in the first alternative signals are transmitted to the user terminal 24 and are also evaluated in this one together with the positional and movement-related data of the transport means, whereas in the second alternative the user terminal 24 transmits signals to a receiver 34 provided at the transport means which are then evaluated in a separate evaluation unit 36 together with the positional and movement-related data of the transport means.

It is to be understood that the exemplary embodiment described above of the method according to the invention is not limiting. Modifications and variations are rather possible without departing from the scope of protection of the present invention that is defined by the annexed claims.

LIST OF REFERENCE NUMERALS 10 bus
12 bus stop sign
14 person
16 bus
18 comparison transmitter
22 comparison receiver

The invention claimed is:

1. A method for automatic detection of the use with costs of a transport means, the method comprising the steps of:
 providing at least one transmitter being arranged in an area of said transport means;
 emitting signals by the transmitter at a constant intensity, the signals including position or movement-related data of said transport means as well as an identification of said transport means;
 providing at least one receiver being integrated in a user terminal of a user;
 receiving the emitted signals by the receiver of the user terminal;
 determining position or movement information of said transport means with said user terminal based on evaluating the position and movement-related data in the emitted signals in the user terminal; and
 detecting of the use of said transport means based on analyzing a change in intensity of successive signals emitted by the transmitter and received by the receiver as well as said determined position or movement information with the user terminal.

2. The method according to claim 1, wherein a receiving and control device arranged at the transport means is used to control the operation of the transmitter by receiving the signals emitted by the transmitter.

3. The method according to claim 2, wherein the transmitter automatically changes the frequency on which the signals are emitting if operation is determined to be interfered or disturbed.

4. The method according to claim 1, further comprising arranging the transmitter inside of the transport means and arranging a comparative transmitter about an outside of the transport means, the comparative transmitter emitting comparative signals.

5. The method according to claim 4, wherein the transmitter and the comparative transmitter emit signals of equal or different predetermined intensity.

6. The method according to claim 4, wherein, if the receiver receives signals from several transmitters or comparative signals from several comparative transmitters, or both, that are arranged at different transport means, the user terminal reduces the number of received signals or comparative signals using exclusion criteria such that a maximum of one signal and one comparative signal remain.

7. The method according to claim 4, further comprising the user terminal comparing the intensity of signals emitted by the transmitter with an intensity of comparative signals emitted by the comparative transmitter to determine if the user terminal is inside or outside the transportation means.

8. The method of claim 7, further comprising the user terminal determining the user terminal is located inside the transportation means based upon determining the intensity of the signals emitted by the transmitter is greater than the intensity of the signals emitted by the comparative transmitter.

9. The method of claim 8, further comprising detecting use of said transportation means based on:
 determining said user terminal is inside of said transport means;
 determining said transportation means is in motion based on said determined position or movement information; and
 determining the intensity of successive emitted signals of said transmitter remain substantially constant.

10. The method according to claim 1, wherein the transmitter emits signals in regular time intervals.

11. A method for automatic detection of the use with costs of a transport means, the method comprising the steps of:
 providing at least one transmitter being integrated in a user terminal of a user;
 emitting signals by the transmitter at a constant intensity, the signals comprising an identification signal that unequivocally identifies the user terminal or the user;
 providing at least one receiver being arranged in the area of said transport means;
 receiving the emitted signals by the receiver;
 determining position or movement information of said transport means; and
 detecting of the use of said transport means based on analyzing of a change in intensity of successive signals received by the receiver as well as said position or movement information.

12. The method according to claim 11, further comprising using a receiver arranged inside of the transport means and a comparative receiver arranged about an outside of the transport means.

13. The method according to claim 12, wherein the transmitter emits signals in regular time intervals.

14. The method according to claim 12, wherein the receiver and the comparitive receiver are each configured to receive the emitted signals, the method further comprising comparing an intensity of the signals received by the receiver with an intensity of the signals received by the comparative receiver to determine if the user terminal is inside or outside the transportation means.

15. The method according to claim 14, further comprising determining the user terminal is inside the transportation means based on determining the intensity of the signals received by the receiver is greater than the intensity of the signals received by the comparative receiver.

16. The method according to claim 15, further comprising detecting use of said transportation means based on:

determining said user terminal is inside of said transport means;

determining said transportation means is in motion based on said determined position or movement information; and determining the intensity of successive signals received by the receiver remain substantially constant.

* * * * *